United States Patent
Bergner et al.

(10) Patent No.: US 12,315,925 B2
(45) Date of Patent: May 27, 2025

(54) ELECTRODE ACTIVE MATERIALS AND METHOD FOR THEIR MANUFACTURE

(71) Applicants: BASF SE, Ludwigshafen am Rhein (DE); IUCF-HYU (INDUSTRY-UNIVERSITY COOPERATION FOUNDATION HANYANG UNIVERSITY), Seoul (KR)

(72) Inventors: Benjamin Johannes Herbert Bergner, Ludwigshafen (DE); Yang-Kook Sun, Seoul (KR); Geon-Tae Park, Seoul (KR); Ji Yong Shin, Amagasaki (JP)

(73) Assignees: BASF SE, Ludwigshafen am Rhein (DE); IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 14 days.

(21) Appl. No.: 17/997,563

(22) PCT Filed: May 5, 2021

(86) PCT No.: PCT/EP2021/061889
§ 371 (c)(1),
(2) Date: Oct. 31, 2022

(87) PCT Pub. No.: WO2021/228662
PCT Pub. Date: Nov. 18, 2021

(65) Prior Publication Data
US 2023/0223528 A1    Jul. 13, 2023

(30) Foreign Application Priority Data
May 12, 2020   (EP) .................................... 20174033

(51) Int. Cl.
*H01M 4/525*   (2010.01)
*C01G 53/42*   (2025.01)
*C01G 53/00*   (2006.01)

(52) U.S. Cl.
CPC ............ *H01M 4/525* (2013.01); *C01G 53/42* (2013.01); *C01P 2002/52* (2013.01);
(Continued)

(58) Field of Classification Search
CPC ..................................................... H01M 4/525
See application file for complete search history.

(56) References Cited

U.S. PATENT DOCUMENTS

2016/0012548 A1   1/2016   Weng
2018/0040889 A1   2/2018   Choi
(Continued)

FOREIGN PATENT DOCUMENTS

DE   102018217507 A1 *   3/2020   ............ H01M 4/366
EP   1876664 A1   1/2008

OTHER PUBLICATIONS

European Search Report for EP Patent Application No. 20174033.9, Issued on Oct. 21, 2020, 3 pages.
(Continued)

*Primary Examiner* — Khanh T Nguyen
(74) *Attorney, Agent, or Firm* — Armstrong Teasdale LLP (57) ABSTRACT

Particulate electrode active material with an average particle diameter in the range of from 2 to 20 μm (D50) having a general formula $Li_{1+x}TM_{1-x}O_2$ wherein TM is a combination of Ni, Co and Al, and, optionally, at least one more metal selected from Mg, Ti, Zr, Nb, Ta, Mo, Mn, and W, with at least 80 mole-% of TM being Ni, and wherein x is in the range of from zero to 0.2, wherein the Co content at the outer surface of the secondary particles is higher than at the center
(Continued)

of the secondary particles by a factor of at most 5 or by at most 30 mol-%, referring to TM.

11 Claims, 6 Drawing Sheets

(52) U.S. Cl.
CPC ...... *C01P 2002/85* (2013.01); *C01P 2002/88* (2013.01); *C01P 2004/03* (2013.01); *C01P 2004/61* (2013.01); *C01P 2004/84* (2013.01); *C01P 2006/40* (2013.01)

(56) References Cited

U.S. PATENT DOCUMENTS

| | | |
|---|---|---|
| 2018/0040891 A1* | 2/2018 | Choi ................... C01G 53/42 |
| 2018/0044200 A1 | 2/2018 | Wu |
| 2019/0044142 A1 | 2/2019 | Sun et al. |

OTHER PUBLICATIONS

International Search Report dated May 28, 2021, PCT/EP2021/061889.

* cited by examiner

FIG.1: Top view-SEM images of the different cathode active materials C-CAM.1, CAM.2, CAM.3, CAM.4, CAM.5, CAM.6

FIG. 2: Cross-sectional SEM images of the different cathode active materials C-CAM.1, CAM.2, CAM.3, CAM.4, CAM.5

FIG. 3: Concentration profile of cross-sectioned particles which were cut in half, determined by EDX (Energy Dispersive X-ray spectroscopy).

FIG. 4A: Cycling profile of C-CAM 1, CAM 2, CAM 3, CAM 4, CAM 5, CAM 6

FIG. 4B: Cycling profile of C-CAM.1, CAM.2, CAM.3, CAM.4, CAM.5, CAM.6

FIG. 5: DSC profiles of C-CAM.3, CAM.4 & CAM.5

FIG. 6: Cracking behavior of C-CAM.1 and CAM.4 and CAM.5

FIG. 7: Cracking behavior of C-CAM.1 and of CAM.5

ELECTRODE ACTIVE MATERIALS AND METHOD FOR THEIR MANUFACTURE

CROSS-REFERENCE TO RELATED APPLICATIONS

This application is a national stage filing under 35 U.S.C. § 371 of International Application No. PCT/EP2021/061889, filed on May 5, 2021, and claims priority to EP Application Serial No. 20174033.9, filed May 12, 2022; the disclosure of each of these applications are incorporated herein by reference in their entirety.

FIELD OF INVENTION

The present invention is directed towards a particulate electrode active material with an average particle diameter in the range of from 2 to 20 μm (D50) having a general formula $Li_{1+x}TM_{1-x}O_2$ wherein TM is a combination of Ni, Co and Al, and, optionally, at least one more metal selected from Mg, Ti, Zr, Nb, Ta, Mo, Mn, and W, with at least 80 mole-% of TM being Ni, and wherein x is in the range of from zero to 0.2, wherein the Co content at the outer surface of the secondary particles is higher than at the center of the secondary particles by a factor of at most 5 or by at most 30 mol-%, referring to TM.

BACKGROUND

Most lithium ion batteries contain an electrolyte that is based on one or more organic solvents that are inflammable. Reactions of the cathode active material with the electrolyte are of key relevance, and, in particular, exothermic reactions need to be studied. A commonly used test for studying potential reactions of the cathode active material with the electrolyte is the determination of the onset temperature by differential scanning calorimetry (DSC) performed on electrochemical cells or on their key components, especially on their cathode active material. A higher onset temperature is desired as well as a low exothermicity.

Existing lithium ion batteries still have potential for improvement, especially with regard to safety issues such as too low an onset temperature, and high cycling stability such as a low capacity fade. Numerous theories have been developed with respect to cycling stability. For example, cracking upon repeated cycling has been made responsible.

In US 2016/012548, certain gradient materials are disclosed. Their nickel content is comparably low, and their capacity leaves room for improvement.

It was an objective of the present invention to provide a process for making precursors of electrode active materials for lithium ion batteries which have high volumetric and gravimetric energy densities and excellent cycling stability, and a good safety behavior. More particularly, it was therefore an objective of the present invention to provide starting materials for batteries which are suitable for producing lithium ion batteries with excellent cycling stability and good safety behavior. It was a further objective of the present invention to provide a process by which suitable starting materials for lithium ion batteries can be prepared.

Without wishing to be bound to any theory, it can be assumed that the lithiation process is depending on the distribution of elements.

In US 2019/0044142, cathode active materials are described in which the manganese and the nickel contents vary over the location of the particles.

DESCRIPTION

Accordingly, the electrode active materials defined at the outset has been found, hereinafter also referred to as inventive electrode active materials or electrode active materials according to the (present) invention. Inventive electrode active materials will be described in more detail below.

In one embodiment of the present invention, inventive electrode active material has an average particle diameter D50 in the range of from 3 to 20 μm, preferably from 5 to 16 μm. The average particle diameter may be determined, e. g., by light scattering or LASER diffraction or electroacoustic spectroscopy. The particles are composed of agglomerates from primary particles, and the above particle diameter refers to the secondary particle diameter.

Inventive electrode active materials have a general formula $Li_{1+x}TM_{1-x}O_2$ wherein TM is a combination of Ni, Co and Al, and, optionally, at least one more metal selected from Mg, Ti, Zr, Nb, Ta, Mo, Mn, and W, with at least 80 mole-% of TM being Ni. Preferably, TM is a combination of metals according to general formula (I)

$$(Ni_aCo_bAl_c)_{1-d}M_d \quad (I)$$

with
a being in the range of from 0.80 to 0.95, preferably from 0.83 to 0.92,
b being in the range of from 0.03 to 0.15, preferably from 0.03 to 0.12,
c being in the range of from 0.02 to 0.12, preferably from 0.03 to 0.12,
and d being in the range of from zero to 0.1, preferably from zero to 0.05,
M is selected from Mn, Mg, Ti, Zr, Nb, Ta, Mo and W, and $$a+b+c=1.$$

The variable x is in the range of from zero to 0.2, preferably 0.01 to 0.05.

In inventive electrode active materials, the Co content at the outer surface of the secondary particles is higher than at the center of the secondary particles by a factor of at most 5 and preferably by a factor of at least 1.5. In other embodiments, especially wherein the Co content in the center of the particles is zero, the Co content at the outer surface of the secondary particles is higher than at the center of the secondary particles by at most 30 mol-%, referring to TM.

In this context, the Co content may increase by a constant slope if depicted from center to outer surface, or by a continuous but non-constant slope, or it may be almost constant in the inner part of the secondary particles and then increase in the outer 30% by volume of such particles which can be quantified by investigation a cross section of such particles with helps of energy-dispersive X-ray spectroscopy (EDS).

In one embodiment of the present invention, the Al content at the outer surface of the secondary particles is higher than at the center of the secondary particles by a factor of at least 1.3 and at most 2.

In one embodiment of the present invention, the nickel content at the surface of the secondary particles is lower than in the center of the respective secondary particles.

In one embodiment of the present invention, the Mn content in TM content is zero.

TM in inventive electrode active material may contain traces of further metal ions, for example traces of ubiquitous metals such as sodium, calcium or zinc, as impurities but such traces will not be taken into account in the description of the present invention. Traces in this context will mean amounts of 0.05 mol-% or less, referring to the total metal content of TM.

In one embodiment of the present invention, inventive electrode active materials have a specific surface (BET) in the range of from 0.1 to 1.5 m$^2$/g. The BET surface may be determined by nitrogen adsorption after outgassing of the sample at 200° C. for 30 minutes and, beyond this, according to DIN-ISO 9277:2003-05.

In one embodiment of the present invention, the primary particles in the outer part of the secondary particles are essentially oriented radially.

The primary particles may be needle-shaped or platelets or a mixture of both. The term "radially oriented" then refers to the length in case of needle-shaped or length or breadth in case of platelets being oriented in the direction of the radius of the respective secondary particle.

In case of radially oriented primary particles, long and thin primary particles are preferred, that means with an aspect ratio in the range of from 3.5 to 5. In this case, the aspect ratio is defined by height along the radial direction/ width perpendicular to that.

The portion of radially oriented primary particles may be determined, e.g., by SEM (Scanning Electron Microscopy) of a cross-section of at least 5 secondary particles.

"Essentially radially oriented" does not require a perfect radial orientation but includes that in an SEM analysis, a deviation to a perfectly radial orientation is at most 5 degrees.

Furthermore, at least 60% of the secondary particle volume is filled with radially oriented primary particles. Preferably, only a minor inner part, for example at most 40%, preferably at most 20%, of the volume of those particles is filled with non-radially oriented primary particles, for example, in random orientation.

In one embodiment of the present invention, the very inner parts of the secondary particles of inventive electrode active material are compact. In this context, the very inner part is meant to be the inner sphere having a diameter of 2 to 4 µm of each secondary particle. That means, in the context of the present invention, that in SEM pictures, no pores or holes may be detected in the very inner part or core of such particles.

Inventive electrode active materials are excellently suited for the manufacture of cathodes for lithium ion batteries and electrochemical cells therefore that help to solve the problems discussed above, especially with respect to safety issues and cycling stability. They show a low tendency to cracking upon repeated cycling, and a high onset temperature.

A further aspect of the present invention is related to a process for making electrode active materials and especially for making inventive electrode active materials. Said process is hereinafter also referred to as inventive process or as "process according to the (present) invention".

The inventive process comprises the following steps (a), (b) and (c), hereinafter also referred to as step (a) and step (b) and step (c) or briefly as (a) or (b) or (c), respectively:

(a) performing a co-precipitation of hydroxides of Ni, Co and—if applicable—at least one more metal selected from Mg, Ti, Zr, Nb, Ta, Mo, Mn, and W by combining an aqueous solution of alkali metal hydroxide and one or more aqueous solution(s) containing water-soluble salts of Ni and of Co, and, if applicable, of at least one of Mg, Ti, Zr, Nb, Ta, Mo, Mn, and W, wherein in the course of the co-precipitation, the relative share of cobalt in the solution(s) containing said salts of Ni and Co increases, thereby obtaining a precursor, (b) mixing the resultant precursor with a source of lithium and with an oxide or hydroxide of Al, and (c) thermally treating the mixture resulting from step (b).

Steps (a), (b) and (c) shall be described in more detail below.

In step (a), an aqueous solution of alkali metal hydroxide is used, hereinafter also referred to as solution (a). An example of alkali metal hydroxides is lithium hydroxide, preferred is potassium hydroxide and a combination of sodium and potassium hydroxide, and even more preferred is sodium hydroxide.

Solution (a) may contain some amount of carbonate, e.g., 0.1 to 2% by weight, referring to the respective amount of alkali metal hydroxide, added deliberately or by aging of the solution or the respective alkali metal hydroxide.

Solution (a) may have a concentration of hydroxide in the range from 0.1 to 12 mol/l, preferably 6 to 10 mol/l.

The pH value of solution (a) is preferably 13 or higher, for example 14.5.

In step (a), furthermore an aqueous solution containing water-soluble salts of Ni and of Co, and, if applicable, of at least one of Mg, Ti, Zr, Nb, Ta, Mo, Mn, and W is used, hereinafter also referred to as solution (B), or at least two aqueous solutions (B) of which one contains a water-soluble salt of nickel and the other a water-soluble salt of cobalt and, optionally, a water soluble salt of nickel and wherein both solutions may contain at least one water-soluble salt of Mg, Ti, Zr, Nb, Ta, Mo, Mn, and W.

In one embodiment of the present invention, in the beginning of step (a), an aqueous solution of alkali metal hydroxide is combined with an aqueous solution containing a water-soluble salt of Ni but no cobalt, and in the course of step (a), an increasing amount of water-soluble salt of cobalt is added.

In one embodiment of the present invention, two solutions (β) are provided, solution (β1) and solution β32), wherein solution (β1) contains a water-soluble salt of nickel but no salt of cobalt, and wherein solution (β2) contains a water-soluble salt of nickel and a water-soluble salt of cobalt, for example 5 to 25 mole-%, referring to the sum of Ni and Co. At the beginning of step (a), a solution (a) and solution (β1) but no solution (β2) are fed simultaneously to a vessel. In the course of step (a), solution (a) and a decreasing share of solution (β1) and an increasing share of solution (β2) are fed simultaneously to a vessel. Solution (β1) and solution (β2) may be fed through separate feeds or subsequently to premixing.

In one embodiment of the present invention, two solutions (B) are provided, solution (β1) and solution (β2), wherein solution (β1) contains a water-soluble salt of nickel and a very low amount of salt of cobalt, for example 1 to 5 mole %, referring to the sum of nickel and cobalt, and wherein solution (β2) contains a water-soluble salt of nickel and a water-soluble salt of cobalt in a higher share, for example 8 to 15 mole-%, referring to the sum of nickel and cobalt. At the beginning of step (a), a solution (a) and solution (β1) but no solution (β2) are fed simultaneously to a vessel. In the course of step (a), solution (a) and a decreasing share of solution (β1) and an increasing share of solution (β2) are fed simultaneously to a vessel. Solution (β1) and solution (β2) may be fed through separate feeds or subsequently to premixing.

In one embodiment of the present invention, at least three solutions (B) are provided, solution (β1) and solution (β2) and solution (β3) and, if applicable, even more solutions (B), wherein solution (β1) contains a water-soluble salt of nickel but no salt of cobalt, and wherein solution (β2) contains a water-soluble salt of nickel and a water-soluble salt of cobalt, for example 5 to 15 mole-%, referring to the sum of Ni and Co and wherein solution (β3) contains a water-soluble salt of nickel and a water-soluble salt of cobalt in a higher ratio of Co:Ni than solution (β2), for example 20 to 30 mole-%, referring to the sum of Ni and Co. At the beginning of step (a), a solution (a) and solution (β1) but neither solution (β2) nor solution (β3) are fed simultaneously to a vessel. In the course of step (a), solution (a) and a decreasing share of solution (β1) and an increasing share of solution (β2) are fed simultaneously to the vessel. In the further course of step (a), solution (a) and a decreasing share of solution (β1) and an increasing share of solution (β3) are fed simultaneously to the vessel. Solution (β1) and solution (β3) may be fed through separate feeds or subsequently to premixing.

It is even more preferred that TM in the precursor is the same as TM in the targeted electrode active material but without aluminum.

The term water-soluble salts of cobalt and nickel or of metals other than nickel and cobalt refers to salts that exhibit a solubility in distilled water at 25° C. of 25 g/l or more, the amount of salt being determined under omission of crystal water and of water stemming from aquo complexes. Water-soluble salts of nickel and cobalt may preferably be the respective water-soluble salts of $Ni^{2+}$ and $Co^{2+}$. Examples of water-soluble salts of nickel and cobalt are the sulfates, the nitrates, the acetates and the halides, especially chlorides. Preferred are nitrates and sulfates, of which the sulfates are more preferred.

In one embodiment of the present invention, the concentration of nickel and cobalt can be selected within wide ranges. Preferably, the total concentration is selected such that they are within the range of, in total, 1 to 1.8 mol of the transition metals/kg of solution, more preferably 1.5 to 1.7 mol of the transition metals/kg of solution. "The transition metal salts" used herein refers to the water-soluble salts of nickel and cobalt, and as far as applicable, Ti, Zr, Nb, Ta, Mo, Mn, and W, and may include salts of other metals, for example of magnesium, but preferably only low amounts, for example 5 mol-% or less and even more preferably no manganese.

Solution(s) (B) may have a pH value in the range of from 2 to 5. In embodiments wherein higher pH values are desired, ammonia may be added to solution (B). However, it is preferred to not add ammonia to solution (B).

In step (a), solution (a) and solution (B) are combined, for example by feeding them simultaneously into a vessel, for example a stirred tank reactor.

It is preferred to use ammonia during step (a) but to feed it separately or in solution (a).

In one embodiment of the present invention, the pH value at the end of the step (a) is in the range from 8 to 12.5, preferably 10.5 to 12.3, and more preferably 11.0 to 12.0, each measured in the mother liquor at 23° C.

In one embodiment of the present invention, the co-precipitation is performed at temperatures in the range from 10 to 85° C., preferably at temperatures in the range from 20 to 60° C.

In one embodiment of the present invention, the co-precipitation is performed under inert gas, for example a noble gas such as argon, or under $N_2$.

In one embodiment of step (a), a slight excess of hydroxide is applied, for example 0.1 to 10 mole-%.

In one embodiment of the present invention, in the course of the co-precipitation, the relative share of cobalt in solution(s) (B) increases, for example from zero to 40 mole-% with respect to TM.

In an alternative embodiment of the present invention, two different solutions (B) are added, hereinafter solutions (β1) and (β2), of which solution (β1) contains a higher amount of water-soluble salt of nickel than solution (β2) and of which solution (β2) contains a higher amount of water-soluble salt of cobalt than (31). In the course of the co-precipitation, then, the feed of solution (β1) is reduced and the feed of solution (β2) is increased. In a preferred embodiment, solution (β1) contains nickel sulfate but no cobalt sulfate, and solution (β2) contains cobalt sulfate but no nickel sulfate.

In the course of step (a) a slurry is formed. In one embodiment of step (a), an overflow system is used to continuously withdraw mother liquor from the reaction vessel.

The solids from the resultant slurry may be isolated by solid-liquid-separation methods, for example decantation, filtration, and by the means of a centrifuge, filtration being preferred. A precursor is obtained.

In preferred embodiments, the precursor is dried, for example under air at a temperature in the range of from 100 to 140° C.

In an—optional—step between steps (a) and (b), the precursor is dried in several sub-steps, for example in at least two sub-steps at different temperatures, for example 80 to 150° C. in sub-step 1 and 165 to 600° C. in sub-step 2. Preferably, the residual moisture content of the precursor is 5% by weight or below, for example 0.01 to 0.5% by weight. In the context of precursor, the moisture content is calculated as g $H_2O$ per 100 g of precursor (A). In this case, $H_2O$ may be bound chemically as hydroxyl group, or be bound by physisorption. It is preferred that the residual moisture in precursor is low, for example 0.1 to 5% by weight.

In one embodiment of the present invention, sub-step 1 is preferably performed in a spray dryer, in a spin-flash dryer or in a contact dryer. Sub-step 2 may be performed in a rotary kiln, a roller heath kiln or in a box kiln.

In one embodiment of the present invention, the resultant precursor is in particulate form. In one embodiment of the present invention, the mean particle diameter (D50) of the resultant precursor is in the range of from 6 to 12 μm, preferably 7 to 10 μm. The mean particle diameter (D50) in the context of the present invention refers to the median of the volume-based particle diameter, as can be determined, for example, by light scattering.

In one embodiment of the present invention, the particle shape of the secondary particles of the resultant precursor is spheroidal, that are particles that have a spherical shape. Spherical spheroidal shall include not just those which are exactly spherical but also those particles in which the maximum and minimum diameter of at least 90% (number average) of a representative sample differ by not more than 10%.

In one embodiment of the present invention, the resultant precursor is comprised of secondary particles that are agglomerates of primary particles. Preferably, precursor is comprised of spherical secondary particles that are agglomerates of needle- or platelet-shaped primary particles. More preferably, the resultant precursor is comprised of spherical secondary particles in which the primary particles in the outer part of the secondary particles are essentially oriented radially. Even more preferably, the resultant precursor is comprised of spherical secondary particles in which the primary particles in the outer part of the secondary particles are essentially oriented radially and wherein the primary particles have an aspect ratio in the range of from 3.5 to 5.

In one embodiment of the present invention, said precursor may have a particle diameter distribution span in the range of from 0.3 to 0.7, the span being defined as [(D90)−(D10)] divided by (D50), all being determined by LASER analysis. In another embodiment of the present invention, said precursor may have a particle diameter distribution span in the range of from 0.8 to 1.4

In one embodiment of the present invention the specific surface (BET) of the resultant precursor is in the range of from 2 to 20 m$^2$/g, determined by nitrogen adsorption, for example in accordance with to DIN-ISO 9277:2003-05.

The cobalt content in such precursor has a gradient.

The resultant precursor may contain traces of metal ions other than Ni and Co, for example traces of ubiquitous metals such as sodium, calcium, iron or zinc, as impurities but such traces will not be taken into account in the description of the present invention. Traces in this context will mean amounts of 0.05 mol-% or less, referring to the total metal content of TM.

In one embodiment of the present invention, the resultant precursor contains one or more impurities such as residual sulphate in case such precursor has been made by co-precipitation from a solution of one or more sulphates of nickel, cobalt and manganese. The sulphate may be in the range of from 0.01 to 0.4% by weight, referring to total precursor.

In step (b), the resultant precursor is mixed with a source of lithium and with an oxide or hydroxide of aluminum (Al).

Examples of sources of lithium are $Li_2O$, LiOH, and $Li_2CO_3$, each water-free or as hydrate, if applicable, for example LiOH · $H_2O$. Preferred example is lithium hydroxide.

Source of lithium is preferable in particulate form, for example with an average diameter (D50) in the range of from 3 to 10 μm, preferably from 5 to 9 μm.

Oxide or hydroxide of aluminum may serve as source of dopant. Examples are $Al(OH)_3$, $Al_2O_3$, $Al_2O_3$·aq, and AlOOH. Preferred are as $Al(OH)_3$, α-$Al_2O_3$, γ-$Al_2O_3$, $Al_2O_3$·aq, and AlOOH. Even more preferred compounds (C) are $Al_2O_3$ selected from α-$Al_2O_3$, γ-$Al_2O_3$, and most preferred is γ-$Al_2O_3$.

In one embodiment of the present invention said an oxide or hydroxide of Al may have a specific surface (BET) In the range of from 1 to 200 m$^2$/g, preferably 50 to 150 m$^2$/g. The surface BET may be determined by nitrogen adsorption, for example according to DIN-ISO 9277:2003-05.

In one embodiment of the present invention, said oxide or hydroxide of aluminum is nanocrystalline. Preferably, the average crystallite diameter of said oxide or hydroxide of aluminum is 100 nm at most, preferably 50 nm at most and even more preferably 15 nm at most. The minimum diameter may be 4 nm.

In one embodiment of the present invention, said oxide or hydroxide of aluminum is a particulate material with an average diameter (D50) in the range of from 1 to 10 μm, preferably 2 to 4 μm. Said oxide or hydroxide of aluminum is usually in the form of agglomerates. Its particle diameter refers to the diameter of said agglomerates.

In a preferred embodiment, said oxide or hydroxide of aluminum is added in an amount of 2 to 10 mole % (referred to the sum of Ni and Co), preferably 0.1 up to 0.5 mole %.

Examples of suitable apparatuses for performing step (b) are high-shear mixers, tumbler mixers, plough-share mixers and free fall mixers. On laboratory scale, mortars with pestles are feasible as well.

In one embodiment of the present invention, step (b) is performed at a temperature in the range of from ambient temperature to 200° C., preferably 20 to 50° C.

In one embodiment of the present invention, step (b) has a duration of 10 minutes to 2 hours. Depending on whether additional mixing is performed in step (c) or not, thorough mixing has to be accomplished in step (b).

Mixing of precursor, source of lithium compound and oxide or hydroxide of aluminum may be performed all in one or in sub-steps, for example by first mixing source of lithium compound and said oxide or hydroxide of aluminum and then combining such mixture with the precursor, or by first mixing precursor and source of lithium and then adding said oxide or hydroxide of aluminum, or by first mixing said oxide or hydroxide of aluminum and precursor and then adding source of lithium. It is preferred to first mix precursor and source of lithium compound and to then add said oxide or hydroxide of aluminum.

Although it is possible to add an organic solvent, for example glycerol or glycol, or water in step (b) it is preferred to perform step (b) in the dry state, that is without addition of water or of an organic solvent.

A mixture is obtained.

Step (c) includes subjecting said mixture to heat treatment at a temperature in the range of from 650 to 1000° C., preferably 650 to 850° C.

In one embodiment of the present invention, the mixture of precursor and source of lithium and compound of Al and, optionally, solvent(s), is heated to 700 to 1000° C. with a heating rate of 0.1 to 10° C./min.

In one embodiment of the present invention, the temperature is ramped up before reaching the desired temperature of from 700 to 1000° C., preferably 750 to 900° C. For example, first the mixture of precursor and source of lithium and oxide or hydroxide of Al is heated to a temperature to 350 to 550° C. and then held constant for a time of 10 min to 4 hours, and then it is raised to 650° C. up to 1000° C., preferably 650 to 850° C.

In embodiments wherein in step (b) at least one solvent has been used, as part of step (c), or separately and before commencing step (c), such solvent(s) are removed, for example by filtration, evaporation or distilling of such solvent(s). Preferred are evaporation and distillation.

In one embodiment of the present invention, step (c) is performed in a roller hearth kiln, a pusher kiln or a rotary kiln or a combination of at least two of the foregoing. Rotary kilns have the advantage of a very good homogenization of the material made therein. In roller hearth kilns and in pusher kilns, different reaction conditions with respect to different steps may be set quite easily. In lab scale trials, box-type and tubular furnaces and split tube furnaces are feasible as well.

In one embodiment of the present invention, step (c) is performed in an oxygen-containing atmosphere, for example in a nitrogen-air mixture, in a rare gas-oxygen mixture, in air, in oxygen or in oxygen-enriched air. In a preferred embodiment, the atmosphere in step (c) is selected from air, oxygen and oxygen-enriched air. Oxygen-enriched air may be, for example, a 50:50 by volume mix of air and oxygen. Other options are 1:2 by volume mixtures of air and oxygen, 1:3 by volume mixtures of air and oxygen, 2:1 by volume mixtures of air and oxygen, and 3:1 by volume mixtures of air and oxygen.

In one embodiment of the present invention, step (c) of the present invention is performed under a forced flow of gas, for example air, oxygen and oxygen-enriched air. Such stream of gas may be termed a forced gas flow. Such stream of gas may have a specific flow rate in the range of from 0.5 to 15 m$^3$/h·kg material according to general formula $Li_{1+x}TM_{1-x}O_2$. The volume is determined under normal conditions: 298 Kelvin and 1 atmosphere. Said forced flow of gas is useful for removal of gaseous cleavage products such as water and carbon dioxide.

In one embodiment of the present invention, step (c) has a duration in the range of from one hour to 30 hours. Preferred are 10 to 24 hours. The cooling time is neglected in this context.

After thermal treatment in accordance to step (c), the electrode active material so obtained is cooled down before further processing. Additional-optional steps before further processing the resultant electrode active materials are sieving and de-agglomeration steps.

By performing the inventive process electrode active materials with excellent properties are available through a straightforward process. Preferably, the electrode active materials so obtained have a specific surface (BET) in the range of from 0.1 to 0.8 m$^2$/g, determined according to DIN-ISO 9277:2003-05.

In one embodiment of the present invention, it can be detected that especially Al is uniformly distributed in electrode active material obtained according to the inventive process, without accumulations.

A further aspect of the present invention refers to electrodes and specifically to cathodes, hereinafter also referred to as inventive cathodes. Inventive cathodes comprise
(A) at least one inventive electrode active material,
(B) carbon in electrically conductive form,
(C) at least one binder.

In a preferred embodiment of the present invention, inventive cathodes contain
(A) 80 to 99% by weight inventive electrode active material,
(B) 0.5 to 19.5% by weight of carbon,
(C) 0.5 to 9.5% by weight of binder polymer, percentages referring to the sum of (A), (B) and (C).

Cathodes according to the present invention contain carbon in electrically conductive modification, in brief also referred to as carbon (B). Carbon (B) can be selected from soot, active carbon, carbon nanotubes, graphene, and graphite. Carbon (B) can be added as such during preparation of electrode materials according to the invention.

Electrodes according to the present invention can comprise further components. They can comprise a current collector (D), such as, but not limited to, an aluminum foil.

They further comprise a binder polymer (C), hereinafter also referred to as binder (C). Current collector (D) is not further described here.

Suitable binders (C) are preferably selected from organic (co) polymers. Suitable (co) polymers, i.e. homopolymers or copolymers, can be selected, for example, from (co) polymers obtainable by anionic, catalytic or free-radical (co) polymerization, especially from polyethylene, polyacrylonitrile, polybutadiene, polystyrene, and copolymers of at least two comonomers selected from ethylene, propylene, styrene, (meth)acrylonitrile and 1,3-butadiene. Polypropylene is also suitable. Polyisoprene and polyacrylates are additionally suitable. Particular preference is given to polyacrylonitrile.

In the context of the present invention, polyacrylonitrile is understood to mean not only polyacrylonitrile homopolymers but also copolymers of acrylonitrile with 1,3-butadiene or styrene. Preference is given to polyacrylonitrile homopolymers.

In the context of the present invention, polyethylene is not only understood to mean homopolyethylene, but also copolymers of ethylene which comprise at least 50 mol % of copolymerized ethylene and up to 50 mol % of at least one further comonomer, for example α-olefins such as propylene, butylene (1-butene), 1-hexene, 1-octene, 1-decene, 1-dodecene, 1-pentene, and also isobutene, vinylaromatics, for example styrene, and also (meth)acrylic acid, vinyl acetate, vinyl propionate, $C_1$-$C_{10}$-alkyl esters of (meth)acrylic acid, especially methyl acrylate, methyl methacrylate, ethyl acrylate, ethyl methacrylate, n-butyl acrylate, 2-ethylhexyl acrylate, n-butyl methacrylate, 2-ethylhexyl methacrylate, and also maleic acid, maleic anhydride and itaconic anhydride. Polyethylene may be HDPE or LDPE.

In the context of the present invention, polypropylene is not only understood to mean homopolypropylene, but also copolymers of propylene which comprise at least 50 mol % of copolymerized propylene and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

In the context of the present invention, polystyrene is not only understood to mean homopolymers of styrene, but also copolymers with acrylonitrile, 1,3-butadiene, (meth)acrylic acid, $C_1$-$C_{10}$-alkyl esters of (meth)acrylic acid, divinylbenzene, especially 1,3-divinylbenzene, 1,2-diphenylethylene and α-methylstyrene.

Another preferred binder (C) is polybutadiene.

Other suitable binders (C) are selected from polyethylene oxide (PEO), cellulose, carboxymethylcellulose, polyimides and polyvinyl alcohol.

In one embodiment of the present invention, binder (C) is selected from those (co) polymers which have an average molecular weight Mw in the range from 50,000 to 1,000,000 g/mol, preferably to 500,000 g/mol.

Binder (C) may be cross-linked or non-cross-linked (co) polymers.

In a particularly preferred embodiment of the present invention, binder (C) is selected from halogenated (co) polymers, especially from fluorinated (co) polymers. Halogenated or fluorinated (co) polymers are understood to mean those (co) polymers which comprise at least one (co) polymerized (co) monomer which has at least one halogen atom or at least one fluorine atom per molecule, more preferably at least two halogen atoms or at least two fluorine atoms per molecule. Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders (C) are especially polyvinyl alcohol and halogenated (co) polymers, for example polyvinyl chloride or polyvinylidene chloride, especially fluorinated (co) polymers such as polyvinyl fluoride and especially polyvinylidene fluoride and polytetrafluoroethylene.

A further aspect of the present invention is an electrochemical cell, containing
(A) a cathode comprising inventive electrode active material (A), carbon (B), and binder (C),
(B) an anode, and
(C) at least one electrolyte.

Embodiments of cathode (1) have been described above in detail.

Anode (2) may contain at least one anode active material, such as carbon (graphite), $TiO_2$, lithium titanium oxide, silicon or tin. Anode (2) may additionally contain a current collector, for example a metal foil such as a copper foil.

Electrolyte (3) may comprise at least one non-aqueous solvent, at least one electrolyte salt and, optionally, additives.

Non-aqueous solvents for electrolyte (3) can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably poly-alkylene glycols having two methyl or ethyl end caps.

The molecular weight Mw of suitable polyalkylene glycols and in particular suitable polyethylene glycols can be at least 400 g/mol.

The molecular weight Mw of suitable polyalkylene glycols and in particular suitable polyethylene glycols can be up to 5,000,000 g/mol, preferably up to 2,000,000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane. Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and, in particular, 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

(II)

(III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^2$ and $R^3$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

(IV)

The solvent or solvents is/are preferably used in the water-free state, i.e. with a water content in the range from 1 ppm to 0.1% by weight, which can be determined, for example, by Karl-Fischer titration.

Electrolyte (3) further comprises at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as LIN $(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where m is defined as follows:
t=1, when Y is selected from among oxygen and sulfur,
t=2, when Y is selected from among nitrogen and phosphorus, and
t=3, when Y is selected from among carbon and silicon.

Preferred electrolyte salts are selected from among LiC $(CF_3SO_2)_3$, $LiN(CF_3SO_2)_2$, $LiPF_6$, $LiBF_4$, $LiClO_4$, with particular preference being given to $LiPF_6$ and LiN $(CF_3SO_2)_2$.

In a preferred embodiment of the present invention, electrolyte (3) contains at least one flame retardant. Useful flame retardants may be selected from trialkyl phosphates, said alkyl being different or identical, triaryl phosphates, alkyl dialkyl phosphonates, and halogenated trialkyl phosphates. Preferred are tri-$C_1$-$C_4$-alkyl phosphates, said $C_1$-$C_4$-alkyls being different or identical, tribenzyl phosphate, triphenyl phosphate, $C_1$-$C_4$-alkyl di-$C_1$-$C_4$-alkyl phosphonates, and fluorinated tri-$C_1$-$C_4$-alkyl phosphates, In a preferred embodiment, electrolyte (3) comprises at least one flame retardant selected from trimethyl phosphate, $CH_3$—P(O)(OCH$_3$)$_2$, triphenylphosphate, and tris-(2,2,2-trifluoroethyl)phosphate.

Electrolyte (3) may contain 1 to 10% by weight of flame retardant, based on the total amount of electrolyte.

In an embodiment of the present invention, batteries according to the invention comprise one or more separators (4) by means of which the electrodes are mechanically separated. Suitable separators (4) are polymer films, in particular porous polymer films, which are unreactive toward metallic lithium. Particularly suitable materials for separators (4) are polyolefins, in particular film-forming porous polyethylene and film-forming porous polypropylene.

Separators (4) composed of polyolefin, in particular polyethylene or polypropylene, can have a porosity in the range from 35 to 50%. Suitable pore diameters are, for example, in the range from 30 to 500 nm.

In another embodiment of the present invention, separators (4) can be selected from among PET nonwovens filled with inorganic particles. Such separators can have a porosity in the range from 40 to 55%. Suitable pore diameters are, for example, in the range from 80 to 750 nm.

Batteries according to the invention can further comprise a housing which can have any shape, for example cuboidal or the shape of a cylindrical disk. In one variant, a metal foil configured as a pouch is used as housing.

Batteries according to the invention provide a very good discharge and cycling behavior, in particular at high temperatures (45° C. or higher, for example up to 60° C.) in particular with respect to the capacity loss.

Batteries according to the invention can comprise two or more electrochemical cells that combined with one another, for example can be connected in series or connected in parallel. Connection in series is preferred. In batteries according to the present invention, at least one of the electrochemical cells contains at least one electrode according to the invention. Preferably, in electrochemical cells according to the present invention, the majority of the electrochemical cells contain an electrode according to the present invention. Even more preferably, in batteries according to the present invention all the electrochemical cells contain electrodes according to the present invention.

The present invention further provides for the use of batteries according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered staplers.

The present invention is further illustrated by working examples.

All co-precipitations were performed in a 17-liter stirred tank reactor equipped with four inlets but no overflow system under an atmosphere of $N_2$ that was constantly replenished during step (a). All aqueous solutions were made with de-ionized water. All precipitations were performed under stirring. On regular base, aliquots of the slurries were analyzed for particle diameter.

I. Manufacture of Precursors by Co-Precipitation, Step (a)

I.1 Manufacture of a Comparative Precursor, Step C-(a.1)

The following solutions were used:

Solution ($\alpha$.1): 4.0 mol/l NaOH in water

Solution ($\beta$2.1): in total 2.0 mol/l $NiSO_4 \cdot 6H_2O$ and $CoSO_4 \cdot 7H_2O$ (molar ratio Ni:Co=9:1), in water The 17-l titer stirred tank reactor was charged with 2 liters of an aqueous solution of ammonia and solution ($\alpha$.1).

Concurrently, solution ($\alpha$.1), solution ($\beta$2.1) and a 10.5 mol/l ammonia solution were simultaneously pumped into the stirred tank reactor with constant speeds. A comparative precursor CTM-OH. 1[$Ni_{0.9}Co_{0.1}$](OH)$_2$ was obtained by filtration, washing, and vacuum drying at 110° C. for 12 hours in the form of a powder from spherical particles, diameter: 11 µm. The comparative precursor C-TM-OH.1 had a composition that was constant over the diameter of the particles. Thus, the particles did not show a gradient of cobalt.

I.2 Manufacture of a Precursor According to the Invention, Step (a.2)

The following solutions were used:

Solution ($\alpha$.1): 4.0 mol/l NaOH in water

Solution ($\beta$1.2): 2.0 mol/l $NiSO_4 \cdot 6H_2O$ in water

Solution ($\beta$2.2): in total 2.0 mol/l $NiSO_4 \cdot 6H_2O$ and $CoSO_4 \cdot 7H_2O$, (molar ratio Ni:Co=90:10), in water Solution ($\beta$3.2): in total 2.0 mol/l $NiSO_4 \cdot 6H_2O$ and $CoSO_4 \cdot 7H_2O$, (molar ratio Ni:Co=73:27), in water The 17-l titer stirred tank reactor was charged with 2 liters of an aqueous solution of ammonia and solution ($\alpha$.1).

Concurrently, solution ($\alpha$.1), solution ($\beta$1.2) and a 10.5 mol/l ammonia solution were simultaneously pumped into the stirred tank reactor with constant speeds. A precipitation of Ni(OH)$_2$ could be observed. As soon as the average particle diameter (D59) had reached 6.4 µm, solution ($\alpha$.1), solution ($\beta$2.2) and a 10.5 mol/l ammonia solution were simultaneously pumped into the stirred tank reactor at constant speeds. As soon as the average particle diameter (D50) had reached 10.0 µm, solution ($\alpha$.1), solution ($\beta$3.2) and a 10.5 mol/l ammonia solution were simultaneously pumped into the stirred tank reactor with constant speeds.

A mixed hydroxide TM-OH. 2[$Ni_{0.9}Co_{0.1}$](OH)$_2$ with a concentration gradient of Ni and Co was obtained by the above co-precipitation. The precursor TM-OH. 2 was recovered by filtration, washing, and vacuum drying at 110° C. for 12 hours in the form of a powder from spherical particles with an average particle diameter (D50) of 11 µm.

II. Conversion of Precursors to Electrode Active Materials, Steps (b) and (c), General Method II.1 Mixing, Step (b)

In a Thinky mixer, C-TM-OH.1 or TM-OH. 2 were mixed with LiOH. $H_2O$ and $Al(OH)_3 \cdot H_2O$ (Li:Al:(Ni+Co) in a molar ratio of 1.01:x:1, see Table 1.

II.2 Thermal Treatment Step, Step (c)

The mixtures obtained from step (b) were calcined in a muffle oven for 10 hours at a temperature of 720° C. under an atmosphere of oxygen. Cathode active materials were obtained.

III. Test Results

Test Protocol for EC:

EC cell tests were performed using a 2032 coin-type half-cell with Li metal as a counter electrode. The cells were charged and discharged by applying a constant current density of 18 mA g$^{-1}$ (0.1 C) for initial cycle and 90 mA g$^{-1}$ (0.5 C) for electrochemical cycling between 2.7 and 4.3 V.

Figure 1:
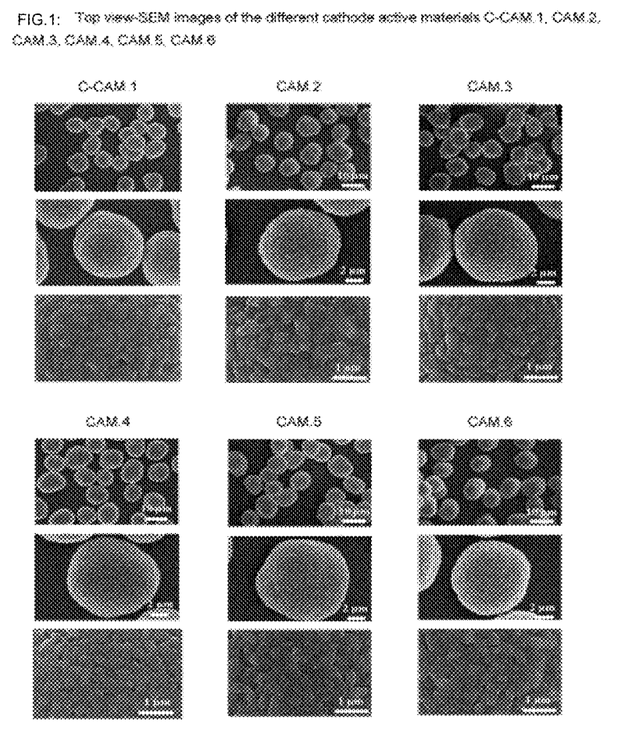
FIG. 1 illustrates top view-SEM images of the cathode active materials C-CAM.1, CAM.2, CAM.3, CAM.4, CAM.5, CAM.6.
Figure 2:
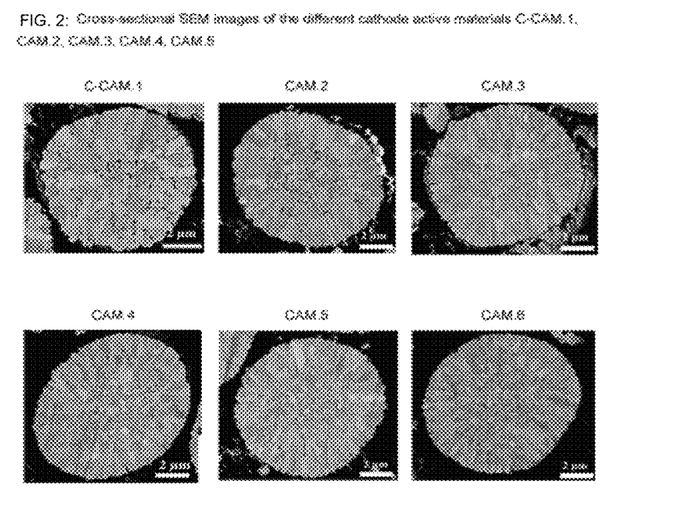
FIG. 2 illustrates cross-sectional SEM images of the cathode active materials C-CAM.1, CAM.2, CAM.3, CAM.4, CAM.5.
Figure 3:
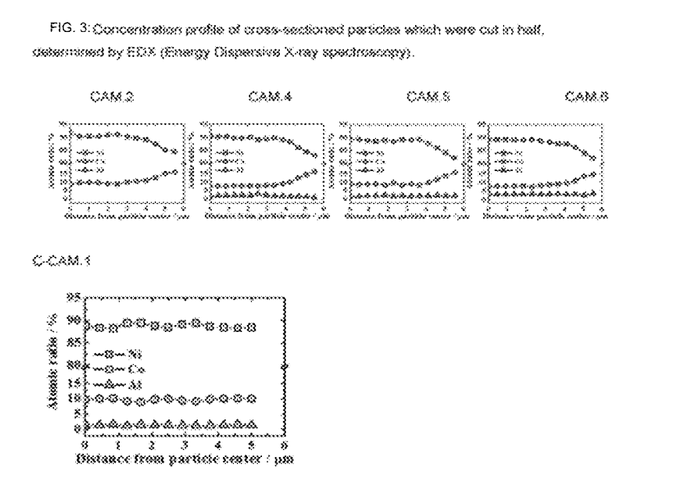
FIG. 3 illustrates a concentration profile of cross-sectioned particles of CAM.2, CAM.4, CAM.5, CAM.6 and C-CAM.1, which were cut in half, determined by EDX (Energy Dispersive X-ray spectroscopy)
Figure 4A:
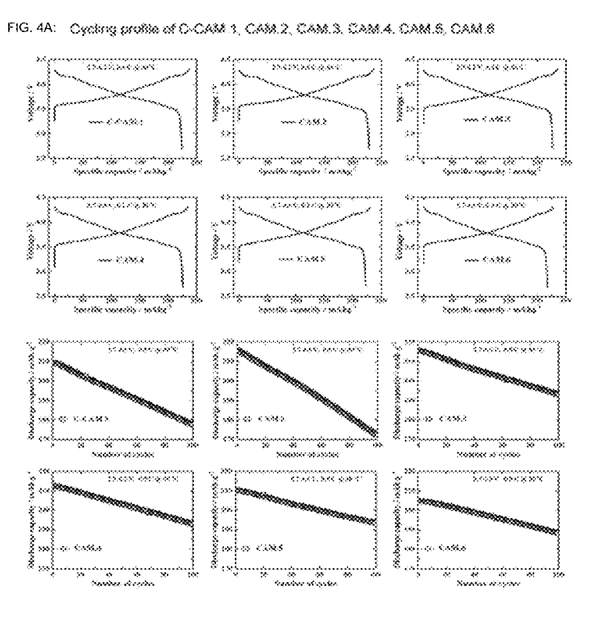
FIGS. 4A-4B illustrate a cycling profile of C-CAM.1, CAM.2, CAM.3, CAM.4, CAM.5, CAM.6.
Figure 4B:
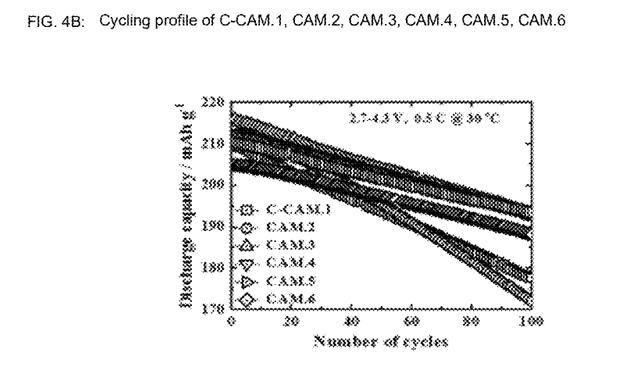
Figure 5:
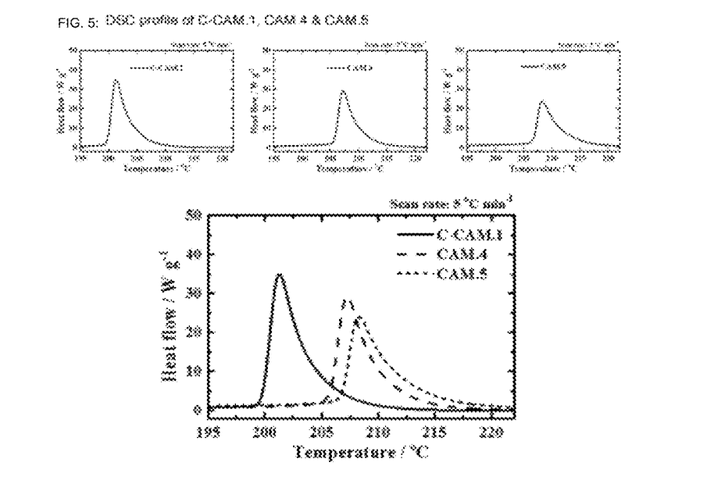
FIG. 5 illustrates a DSC profile of C-CAM.1, CAM.4 & CAM.5.
Figure 6:
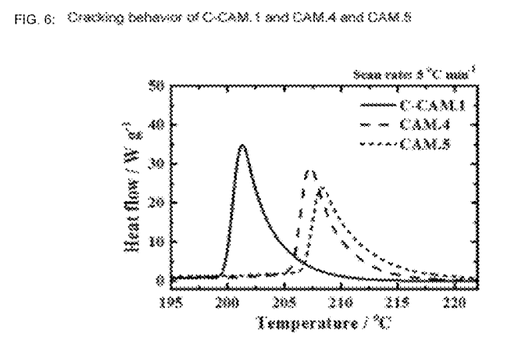
FIG. 6 illustrates a cracking behavior of C-CAM.1 and CAM.4 and CAM.5.
Figure 7:
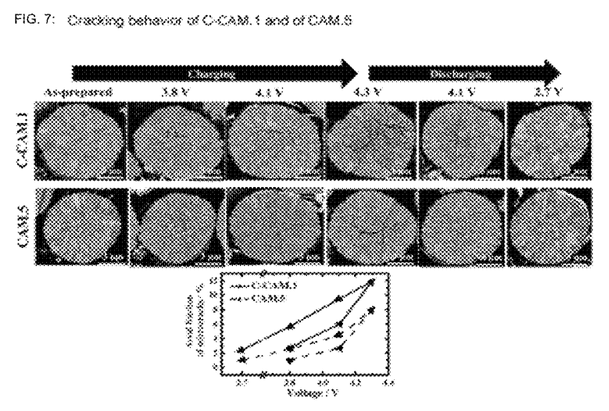
FIG. 7 illustrates a cracking behavior of C-CAM.1 and of CAM.5.

SEM:

The morphology and structure of the calcined powder particles were examined through scanning electron microscopy (SEM) (Nova Nano SEM 450, FEI).

Cross-Section:

For the observation of the cross-section of the cathode material particles by SEM, the recovered cathodes at different states were washed immediately using dimethyl carbonate and then dried under vacuum in an Ar-filled glovebox. The electrodes were cut using a cross-sectional polisher (CP, JEOL SM-09010). After preparing cross-sections of each CAMs, primary particle morphology and microcracks were checked by SEM

DSC:

Differential scanning calorimetry (DSC) analysis was conducted for the cells fully charged up to 4.3 V. Then, the charged half cells were disassembled in an Ar-filled glovebox, and the positive electrodes were retrieved. The electrodes were rinsed with DMC solution to remove the electrolyte, and the cathode materials were recovered from the Al current collector. A stainless steel sealed pan with a gold-plated copper seal was used to collect 7 to 8 mg of samples. Measurements were carried out using a DSC 214 Polyma (NETZSCH, Germany) at a temperature scan rate of 5° C. min$^{-1}$.

TABLE 1

Compositions and test results

| | precursor | x | Aspect ratio | 0.1 C $1^{st}$ Dis-Cap | 0.1 C $1^{st}$ cycle efficiency | 0.5 C $1^{st}$ Dis-Cap | 0.5 C Capacity retention after 100 cycles |
|---|---|---|---|---|---|---|---|
| C-CAM.1 | C-TM-OH.1 | 0.015 | 2.6 | 223.8 | 94.0% | 209.4 | 84.8 |
| CAM.2 | TM-OH.2 | zero | 3.0 | 228.9 | 96.5 | 215.7 | 79.8 |
| CAM.3 | TM-OH.2 | 0.010 | 3.6 | 227.5 | 96.5 | 215.9 | 89.4 |
| CAM.4 | TM-OH.2 | 0.015 | 3.9 | 225.3 | 95.8 | 212.5 | 90.8 |
| CAM.5 | TM-OH.2 | 0.020 | 4.0 | 222.4 | 95.5 | 210.5 | 91.9 |
| CAM.6 | TM-OH.2 | 0.030 | 4.1 | 218.3 | 95.4 | 204.9 | 91.9 |

Aspect ratio = length/width of primary particles extracted from SEM cross sectional images (particles cut in half)
Disc-Cap: discharge capacity in [mAh/g]

TABLE 2

Thermal stability of selected cathode active materials

| | DSC onset temperature [° C.] | DSC peak temperature [° C.] | Enthalpy [J/g] |
|---|---|---|---|
| C-CAM.1 | 200.6 | 200.7 | 1753 |
| CAM.4 | 205.3 | 205.4 | 1347 |
| CAM.5 | 207.4 | 207.5 | 1280 |

The invention claimed is:

1. A particulate electrode active material with an average particle diameter ranging from 2 μm to 20 μm (D50) having a general formula $Li_{1+x}TM_{1-x}O_2$,
wherein TM is a combination of Ni, Co and Al, and, optionally, at least one more metal selected from Mg, Ti, Zr, Nb, Ta, Mo, Mn, and W, with at least 80 mole-% of TM being Ni,
wherein x ranges from zero to 0.2, and
wherein the Co content at an outer surface of secondary particles is higher than at a center of secondary particles by at most 30 mol-%, referring to TM;
wherein the Co content at the outer surface of the secondary particles is higher than at the center of the secondary particles by a factor of at least 1.5.

2. The electrode active material according to claim 1, wherein TM is a combination of metals according to general formula (I)

$(Ni_aCo_bAl_c)_{1-d}M_d$     (I)

with
a ranging from 0.80 to 0.95,
b ranging 0.03 to 0.15,
c ranging from 0.02 to 0.10, and
d ranging from zero to 0.1,
M is selected from Mn, Mg, Ti, Zr, Nb, Ta, Mo and W, and $a+b+c=1$.

3. The electrode active material according to claim 1, wherein primary particles in the outer part of the secondary particles are essentially oriented radially.

4. The electrode active material according to claim 1, wherein the Mn content in TM is zero.

5. The electrode active material according to claim 1, wherein the Al content at the outer surface of the secondary particles is higher than at the center of the secondary particles by a factor of at least 1.3 and at most 2.

6. A process for making an electrode active material according to claim 1 comprising the steps of
(a) performing a co-precipitation of hydroxides of Ni, Co and—if applicable—at least one more metal selected from Mg, Ti, Zr, Nb, Ta, Mo, Mn, and W by combining an aqueous solution of alkali metal hydroxide and one or more aqueous solution(s) containing water-soluble salts of Ni and Co, and, if applicable, of Mg, Ti, Zr, Nb, Ta, Mo, Mn, or W, wherein in the course of the co-precipitation, the relative share of cobalt (Co) in the solution(s) containing the salts of Ni and Co increases, to obtain a precursor,
(b) mixing the precursor with a source of lithium and with an oxide or hydroxide of Al to form a mixture, and
(c) thermally treating the mixture from step (b).

7. The process according to claim 6, wherein in step (a), combining an aqueous solution of alkali metal hydroxide with an aqueous solution containing a water-soluble salt of Ni but no cobalt, and in the course of step (a), increasing an amount of water-soluble salt of cobalt is added.

8. The process according to claim 6, wherein step (b) is performed in a mixer.

9. The process according to claim 6, wherein the process additionally comprises a step (d) subsequent to step (c), and wherein step (d) is selected from coating steps and wet treatment steps.

10. An electrode comprising
(A) at least one particulate electrode active material according to claim 1,
(B) at least one binder and, optionally,
(C) further carbon in electrically conductive form.

11. An electrochemical cell comprising a cathode according to claim 10.

* * * * *